US010911547B2

(12) United States Patent
Suryanarayana et al.

(10) Patent No.: US 10,911,547 B2
(45) Date of Patent: Feb. 2, 2021

(54) SYSTEMS AND METHODS FOR SMB MONITOR DIALECT

(71) Applicant: Dell Products L.P., Round Rock, TX (US)

(72) Inventors: Shekar Babu Suryanarayana, Bangalore (IN); Sumanth Vidyadhara, Bangalore (IN); Parmeshwr Prasad, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 353 days.

(21) Appl. No.: 15/856,392

(22) Filed: Dec. 28, 2017

(65) Prior Publication Data

US 2019/0208023 A1 Jul. 4, 2019

(51) Int. Cl.
*H04L 29/08* (2006.01)
*G06F 15/167* (2006.01)
*H04L 29/06* (2006.01)

(52) U.S. Cl.
CPC ............ *H04L 67/148* (2013.01); *H04L 67/14* (2013.01); *H04L 67/141* (2013.01); *G06F 15/167* (2013.01); *H04L 69/16* (2013.01)

(58) Field of Classification Search
CPC ...... H04L 67/148; H04L 67/14; H04L 67/141
See application file for complete search history.

(56) References Cited

U.S. PATENT DOCUMENTS 5,727,171 A * 3/1998 Iachetta, Jr. ........ G06F 13/4217
710/107
6,631,434 B1 * 10/2003 Johnson ................... G06F 13/24
710/260
7,161,911 B1 * 1/2007 Fang ........................ H04B 1/44
370/282
7,360,072 B1 * 4/2008 Soltis .................... G06F 9/4416
709/222
8,750,239 B1 * 6/2014 Martini ................... H04L 47/76
370/329
8,806,030 B2 * 8/2014 Zhu ....................... H04L 67/141
709/228

(Continued)

OTHER PUBLICATIONS

Microsoft, "Improve Performance of a File Server with SMB Direct", Aug. 30, 2016, https://docs.microsoft.com/en-us/previous-versions/windows/it-pro/windows-server-2012-r2-and-2012/jj134210(v%3Dws.11).*

(Continued)

*Primary Examiner* — Ramy M Osman
(74) *Attorney, Agent, or Firm* — Jackson Walker L.L.P.

(57) ABSTRACT

An information handling system may include at least one processor and a network interface controller communicatively coupled thereto. The network interface controller may be configured to provide network communication between the information handling system and a remote information handling system according to a Server Message Block (SMB) protocol. The information handling system may further be configured to establish a communication session with the remote information handling system according to a first SMB channel having a first bandwidth, and in response to an indication from the remote information handling system, transition the communication session to a second, different SMB channel having a second bandwidth greater than the first bandwidth.

19 Claims, 4 Drawing Sheets

(56) References Cited

U.S. PATENT DOCUMENTS

| | | | | |
|---|---|---|---|---|
| 9,332,561 B1* | 5/2016 | Khawam | | H04L 67/1091 |
| 9,438,696 B2* | 9/2016 | Kruse | | H04L 67/14 |
| 9,774,539 B1* | 9/2017 | Jia | | H04L 69/14 |
| 2006/0271697 A1* | 11/2006 | Kruse | | H04L 67/147 |
| | | | | 709/230 |
| 2012/0063301 A1* | 3/2012 | Schel | | H04W 36/26 |
| | | | | 370/225 |
| 2012/0144019 A1* | 6/2012 | Zhu | | H04L 69/40 |
| | | | | 709/224 |
| 2013/0007180 A1* | 1/2013 | Talpey | | H04L 67/06 |
| | | | | 709/212 |
| 2013/0182575 A1* | 7/2013 | McLean | | H04L 47/122 |
| | | | | 370/237 |
| 2014/0173050 A1* | 6/2014 | Locker | | H04L 67/104 |
| | | | | 709/219 |
| 2015/0039821 A1* | 2/2015 | Sasaki | | G06F 13/1663 |
| | | | | 711/105 |
| 2019/0208023 A1* | 7/2019 | Suryanarayana | | H04L 67/141 |
| 2020/0089522 A1* | 3/2020 | Qiu | | G06F 9/45558 |

OTHER PUBLICATIONS

Microsoft, "Performance tuning for SMB file servers", Apr. 14, 2017 https://docs.microsoft.com/en-us/windows-server/administration/performance-tuning/role/file-server/smb-file-server (Year: 2017).*

* cited by examiner

SYSTEMS AND METHODS FOR SMB MONITOR DIALECT

TECHNICAL FIELD

The present disclosure relates in general to information handling systems, and more particularly to methods and systems for transitioning a network connection from one channel to a different channel that has a different (e.g., a higher) amount of bandwidth. This disclosure may have particular applications within the field of Server Message Block (SMB) protocols.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some network protocols (e.g., SMB protocols), a problem may arise in that there is no generally accepted way to transition a communication session from one channel to another channel. For example, an information handling system may have a remote direct memory access (RDMA) network interface controller (NIC), often referred to as an RNIC. If sufficient bandwidth is available at the time that a session is established by the RNIC, the session may be established as an RDMA session; however, if sufficient bandwidth is not available, the session may be established as a slower transmission control protocol/internet protocol (TCP/IP) session. In this latter case, although more bandwidth may later become available, there is no existing way of simply transitioning the session from the TCP/IP channel to an RDMA channel.

According to known techniques, in order to achieve RDMA speeds, the existing session would be closed, and a new session would be established. This can incur significant delays, as the number of wasted round-trip communications required to close the old session and establish the new session may be large.

The issues associated with known techniques may be particularly relevant in, for example, a virtualization context, as the bandwidth available to individual virtual machines (VMs) may vary significantly over time. If a VM establishes a session over a TCP/IP channel due to low bandwidth, it would be desirable to be able to transition that session to RDMA at a later time when more bandwidth is available to that VM. There is no existing solution to start a communication session over the TCP/IP channel and later (e.g., as soon as RDMA bandwidth is available) switch from TCP/IP to a faster RDMA channel without disconnecting the existing session (e.g., including closing all open descriptors, tree connects, etc.).

The issues associated with known techniques may also be particularly relevant in the context of a pre-boot environment. For example, a basic input/output system (BIOS) pre-boot environment such as Unified Extensible Firmware Interface (UEFI) may be used for network booting of a client information handling system from a server information handling system. Network booting may involve the transfer of a significant amount of data over the network, and so the ability to transition to a higher-bandwidth channel may save a significant amount of time. Because different ports may operate at different capabilities (at the client and/or the server), initially the negotiated port or network may not support RDMA capability, and thus a client may initially discover only a low-bandwidth TCP/IP connection to a network boot server. At a later time, it may be desirable for the server to dynamically push the client to a faster RDMA connection, or for the client to renegotiate for the faster connection. But the ability to dynamically switch a connection to a faster RDMA channel without closing and reestablishing the session has heretofore been unavailable.

This disclosure provides various techniques that may be employed in these and other situations.

SUMMARY

In accordance with the teachings of the present disclosure, the disadvantages and problems associated with networking of information handling systems may be reduced or eliminated.

In accordance with embodiments of the present disclosure, an information handling system may include at least one processor and a network interface controller communicatively coupled to the at least one processor and configured to provide network communication between the information handling system and a remote information handling system according to an SMB protocol. The information handling system may be configured to establish a communication session with the remote information handling system according to a first SMB channel having a first bandwidth. The information handling system may be further configured to, in response to an indication from the remote information handling system, transition the communication session to a second, different SMB channel having a second bandwidth greater than the first bandwidth.

In these and other embodiments, a method may include establishing, via a network interface controller of an information handling system, a communication session with a remote information handling system according to an SMB protocol using a first SMB channel having a first bandwidth. The method may further include, in response to an indication from the remote information handling system, transitioning the communication session to a second, different SMB channel having a second bandwidth greater than the first bandwidth.

In these and other embodiments, an article of manufacture may include a non-transitory, computer-readable medium having instructions coded thereon that are executable by at least one processor of an information handling system. The instructions may cause the information handling system to establish, via a network interface controller of the information handling system, a communication session with a remote information handling system according to an SMB protocol using a first SMB channel having a first bandwidth. The instructions may further cause the information handling system to, in response to an indication from the remote information handling system, transition the communication session to a second, different SMB channel having a second bandwidth greater than the first bandwidth.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected indirectly or directly, with or without intervening elements.

For the purposes of this disclosure, computer-readable media (e.g., transitory or non-transitory computer-readable media) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
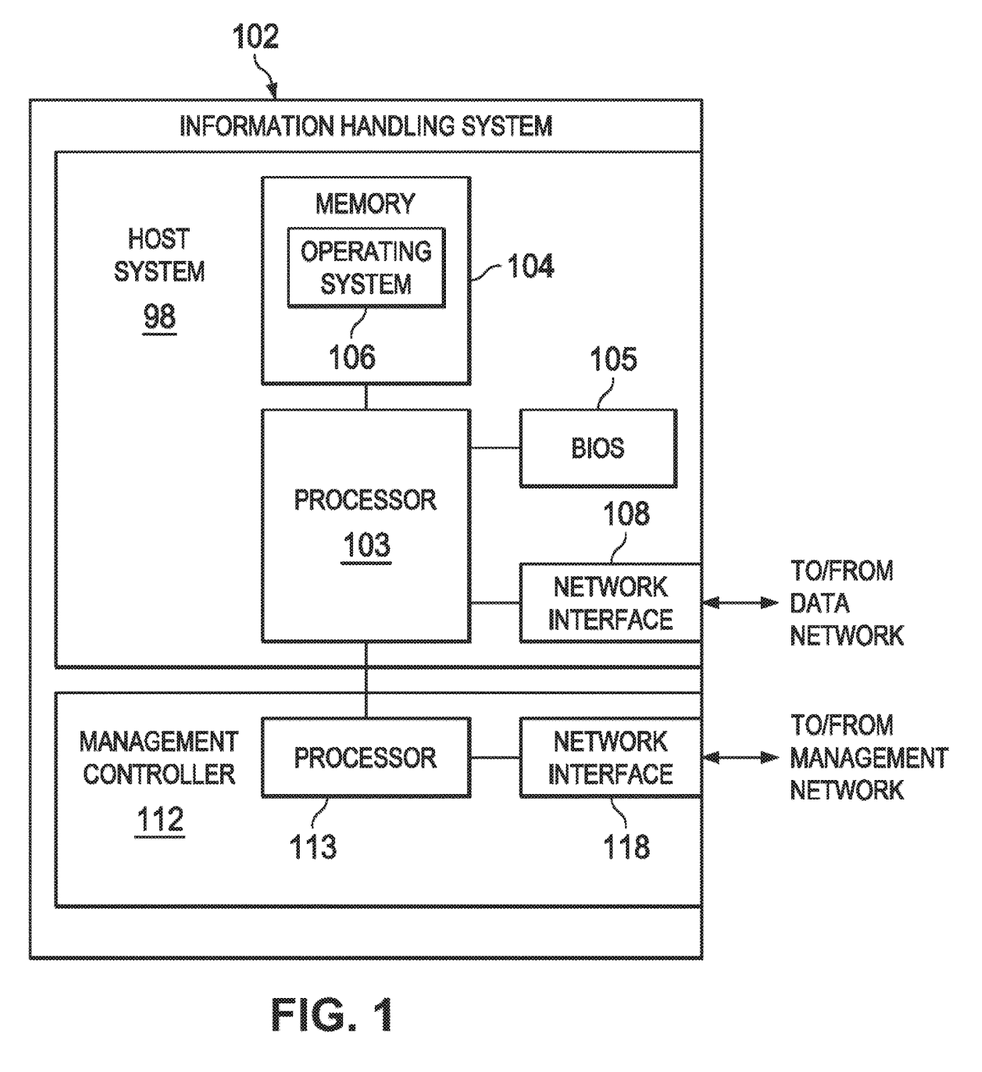
FIG. 1 illustrates a block diagram of an example information handling system, in accordance with embodiments of the present disclosure.

FIG. 1 illustrates a block diagram of an example information handling system 102. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102. In some embodiments, BIOS 105 may be used for network booting of a client information handling system from a server information handling system (e.g., via network interface 108).

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card. In some embodiments, network interface 108 may (alternatively or in addition) include circuitry to allow it to communicate via an RDMA channel. That is, network interface 108 may comprise an RNIC. In some embodiments, a plurality of network interface adapters may be referred to in the aggregate by network interface 108, at least one of which may be configured for communication via an RDMA channel. In some embodiments, network interface 108 may include an RNIC configured to communicate via a fibre channel network.

In operation, processor 103, memory 104, BIOS 105, and network interface 108 may comprise at least a portion of a host system 98 of information handling system 102.

Management controller 112 may be configured to provide management facilities for management of information handling system 102. Such management may be made by management controller 112 even if information handling system 102 and/or host system 98 are powered off or powered to a standby state. Management controller 112 may include a processor 113, memory, and a management network interface 118 separate from and physically isolated from data network interface 108. In certain embodiments, management controller 112 may include or may be an integral part of a baseboard management controller (BMC), a chassis management controller (CMC), or a remote access controller (e.g., a Dell Remote Access Controller or Integrated Dell Remote Access Controller). As shown in FIG. 1, management controller 112 may comprise a processor 113 and a network interface 118 communicatively coupled to processor 113.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network 108, or in other embodiments it may be a device of a different type. Either or both of network interface 108 and network interface 118 may be an RNIC, in various embodiments.

In some embodiments, network interface 108 may be configured to communicate via an SMB protocol, e.g., by any of the standard SMB dialects (NTLM, LANMAN, etc.), either via standard TCP/IP or via RDMA.

In addition, network interface 108 may also be configured to implement an SMB monitor dialect (SMD). The use of SMD may allow for intelligent monitoring of the RDMA bandwidth availability, and dynamic triggering of a renegotiation for a faster RDMA channel without disconnecting an existing session that may have been initially established over a TCP/IP channel. Throughout this disclosure, for purposes of clarity and exposition, the specific example of TCP/IP and RDMA channels will be discussed. One of ordinary skill in the art with the benefit of this disclosure will understand the applicability of this disclosure to other communication channels that may have varying amounts of bandwidth. Further, it will be understood that the term "bandwidth" is used herein to refer generally to the amount of data that can be transmitted in a given amount of time.

In some embodiments, the implementation of SMD may include the setting of one or more capability bits or flags in a protocol header (e.g., a packet or datagram). For example, if both the SMB client and SMB server support SMD, then one or more protocol bits or flags may be set by the server during initial negotiation. In response, the SMB client may respond with a dialect index indicating the capability (e.g., NTLM with SMD, LANMAN with SMD, etc.). If SMD is not supported or not needed, the SMB client may respond to the SMB server with an index only for a dialect such as NTLM, LANMAN, etc.

Once the SMB client and server negotiate for SMD, then at any time the communication channel may be switched from a slower TCP/IP channel to a faster RDMA channel (or vice versa) without disconnecting the existing session.

As one example, during initial negotiation, either the SMB client or the SMB server may indicate an unavailability of the higher RDMA bandwidth, which may cause a TCP/IP communication to be established. Later, when both client and server have sufficient RDMA bandwidth, instead of continuing with the slower TCP/IP channel, they may switch over to the faster RDMA channel without disconnecting the existing sessions (e.g., maintaining all open descriptors, tree connects, etc.). If desired (e.g., due to a subsequent lack of bandwidth), the session may be switched back to TCP/IP in a similar manner.

SMD may in some embodiments be implemented via a module in both the SMB client and SMB server. This module may be referred to herein as an SMB renegotiate module (SRM), and such an SRM may initiate the renegotiation for the RDMA channel if both peers (e. g., the SMB client and SMB server) have RDMA bandwidth available. In various embodiments, the SRM may be implemented in hardware, firmware, and/or software.

The SRM may register for an RDMA high bandwidth availability event with an RNIC event handler/manager. As soon as the bandwidth is available, the RNIC driver may set a "bandwidth available" bit in the event handler, and the event handler may generate the event for the registered SRM.

After receiving the event, the SRM (at either the client or the server) may initiate a renegotiation communication with its peer, without disturbing the existing TCP/IP communication. More detail about an example of this renegotiation procedure is provided below with regard to FIG. 3. All file transfers or other communications may continue as-is with the existing TCP/IP channel until the renegotiation to the RDMA channel is successful.

Upon successful renegotiation, the SRM may intelligently switch over the communication channel from a TCP/IP channel to an RDMA channel. Any running applications which are using the SMB protocol communication session may still continue to use the open descriptors (e.g., open file handles, locks, directory tree ID's, process ID's, multiplex IDs (MIDs), etc.) without closing them as the underlying channel intelligently switches from TCP/IP to RDMA. Further, if any file transfer was happening during the switchover, then without disconnecting the existing TCP/IP session the same file payload may be continued, but with the faster RDMA channel. In some embodiments, such a file transfer may be continued without the retransmission of any data previously transmitted over TCP/IP.

In some embodiments, SMD may be used in a virtualization context. For example, with single-root I/O virtualization (SRIOV) or multi-root I/O virtualization (MRIOV), virtual functions (VFs) may be assigned to VMs in a 1:1 ratio, but such VFs may be unable to guarantee the full RDMA bandwidth for all VMs at any particular time. For example, in some embodiments a single SR/MRIOV RNIC having a limited number of physical ports may be shared across multiple VMs through VFs.

When a VM's performance requirements are low or available bandwidth is low, the SMB protocol with the SMD dialect may operate with a slower TCP/IP session. When a higher bandwidth RDMA channel is available (e.g., via an RNIC), the SMB monitor dialect may dynamically sense the bandwidth availability and interrupt the SMB protocol driver for renegotiation with the peer. With this interrupt, the client or server may renegotiate for RDMA, and if the peer accepts the renegotiation request, the underlying channel may be dynamically switched from the slower TCP/IP channel to the faster RDMA channel without disconnecting the existing SMB sessions. All the capabilities and session handlers may be kept active for continued usage. The renegotiation sequence may be carried out as described with regard to FIG. 3 below; various new commands as described may be integrated with the existing SMB command set.

In addition to processor 103, memory 104, network interface 108, management controller 112, and ROM reliability controller 116, information handling system 102 may include one or more other information handling resources.

Although FIG. 1 depicts information handling system 102 as only having a single host system 98 for the purposes of clarity and exposition, in some embodiments, information handling system 102 may comprise a server rack including a plurality of racks of host systems 98.

Figure 2:
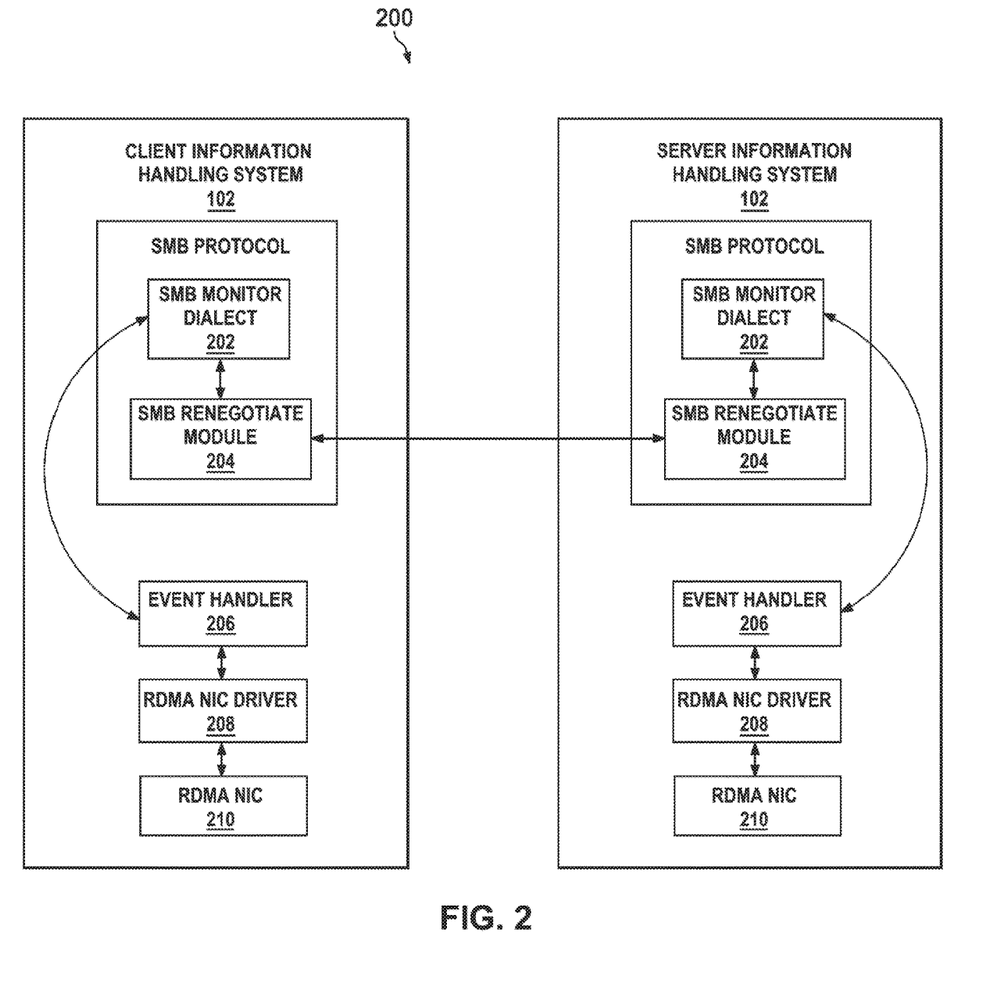
FIG. 2 illustrates a block diagram of an example architecture, in accordance with embodiments of the present disclosure.

Turning now to FIG. 2, an embodiment of an architecture 200 is shown which may be used to implement various aspects of the present disclosure. As shown, client and server information handling systems 102 both implement an SMB protocol, including SMB monitor dialect 202 and SMB renegotiate module 204. Further, each information handling system 102 includes RDMA NIC 210, RDMA NIC driver 208, and event handler 206.

As discussed above, SMB renegotiate modules 204 may register for an RDMA high bandwidth availability event with event handler 206. As soon as the bandwidth is available, RDMA NIC driver 208 may set a "bandwidth available" bit in event handler 206, and event handler 206 may generate the event for the registered SMB renegotiate module 204.

Figure 3:
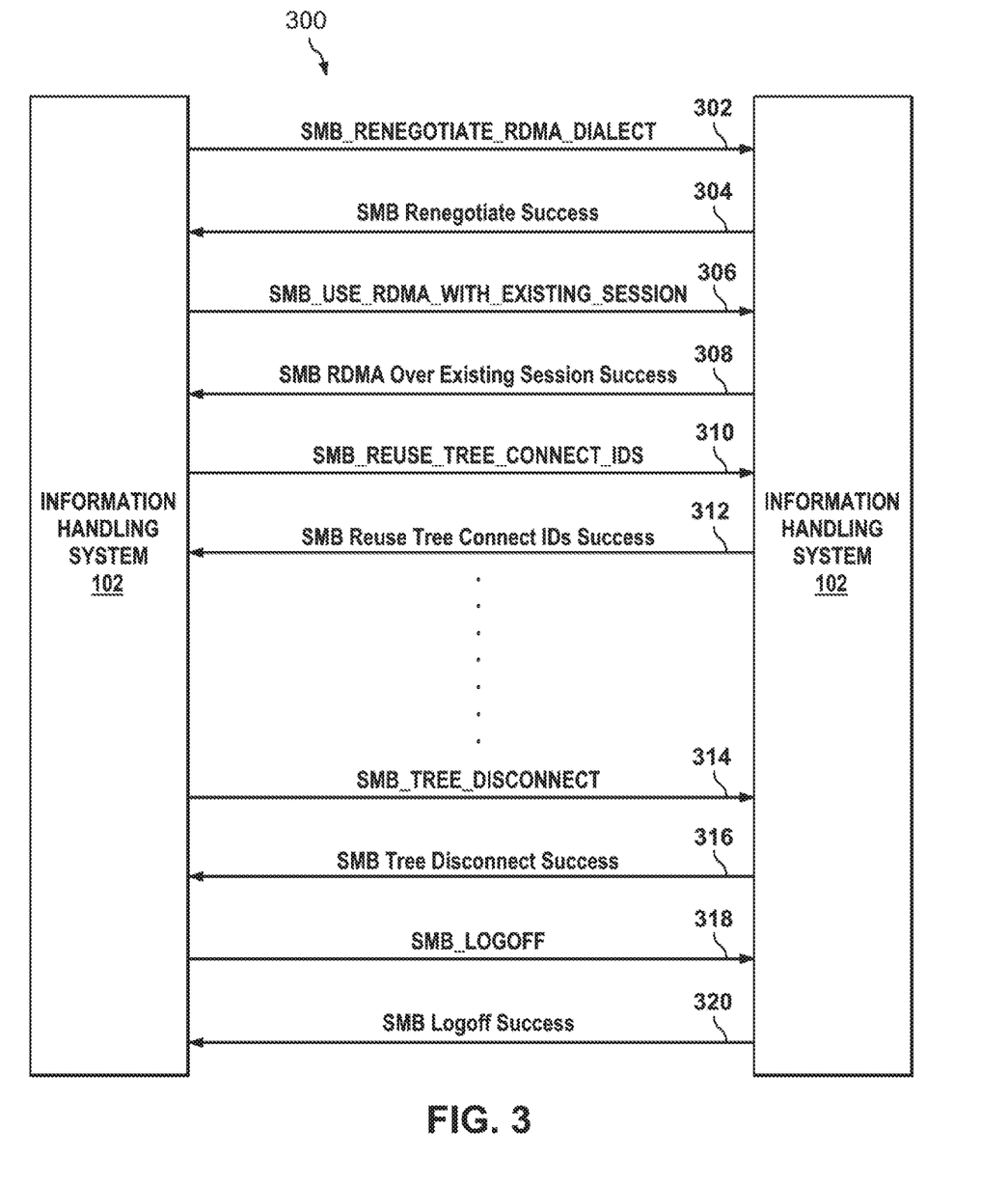
FIG. 3 illustrates an example message sequence, in accordance with embodiments of the present disclosure.

During renegotiation, various messages may be exchanged between SMB renegotiate modules 204 on client and server information handling systems 102, as discussed in further detail with regard to FIG. 3. In some embodiments, these messages for renegotiating to a faster RDMA channel may be exchanged via the existing TCP/IP channel.

Turning now to FIG. 3, a diagram of an example message sequence 300 is shown. In some embodiments, message sequence 300 may take place between two different information handling systems 102 such as the systems depicted in FIG. 1. These two information handling systems 102 may be referred to as "remote" from one another. In some embodiments, an information handling system may be geographically displaced from another information handling system that is considered "remote," but this need not be the case in all instances. For example, in some cases, two information handling systems may be considered "remote" from one another even though they may occupy the same physical chassis (e.g., a plurality of host systems 98 of a single information handling system 102 may be considered "remote" from one another in some contexts).

For the sake of clarity and exposition, the leftmost information handling system 102 will be referred to as the server, and the rightmost information handling system will be referred to as the client. In other embodiments, however, such roles may be reversed.

Message sequence 300 begins after an SMB session has already been established between information handling systems 102 according to a TCP/IP session. As discussed above, this SMB session may have been established with the use of one or more set capability bits or flags in the protocol header to indicate that SMD is supported. The server has determined that sufficient bandwidth is available to switch to an RDMA channel, and so message sequence 300 is initiated.

At message 302, the server sends an SMB_RENEGOTIATE_RDMA_DIALECT command to renegotiate for RDMA operation. At message 304, the client acknowledges success of this command.

At message 306, the server sends an SMB_USE_RDMA_WITH_EXISTING_SESSION command to request a changeover from a NIC-based IP session to an RNIC-based IP session. Internally, a TCP and/or UDP stack may be changed over to an RDMA host channel adapter stack. The existing session need not be disturbed by this change; only the internal transfer mode and data read/write methods are dynamically changed. At message 308, the client acknowledges success of this command.

At message 310, the server sends an SMB_REUSE_TREE_CONNECT_IDS command to request that the existing tree connect IDs (e.g., an open directory list) be reused without closing them. At message 312, the client acknowledges success of this command.

At this stage, the connection has been fully transferred to an RDMA channel, and communications may continue accordingly. Various other commands (not shown) may also be used to implement portions of the present disclosure. For example, SMB_REUSE_FID may indicate that an existing file ID (FID) which is already opened will not be closed, but will be kept open as the underlying network path is changed to RDMA. SMB_RDMA_READ_ANDX may indicate that if any read operation is in progress, without any buffer retransmits, the changeover to RDMA may happen and the read file data may be appended to the same opened file at the next offset. SMB_RDMA_WRITE_ANDX may indicate that if any write operation is in progress, without any buffer retransmits, the changeover to RDMA may happen, and the write file data will be appended to the same opened file at the next offset.

Further, all other existing SMB commands may work as usual once the dynamic changeover happens to the RDMA network path.

Once all desired communication has taken place and the information handling systems are ready to terminate the communications, at message 314 the server sends an SMB_TREE_DISCONNECT command to disconnect the SMB tree connection. At message 316, the client acknowledges success of this command. Finally, at message 318 the server sends an SMB_LOGOFF command, success of which is acknowledged at message 320.

As one of ordinary skill in the art with the benefit of this disclosure will understand, various modifications may be made to the specific commands and messages shown in FIG. 3 to adapt the procedure to any network protocol that needs dynamic capabilities such as those described in this disclosure.

Figure 4:
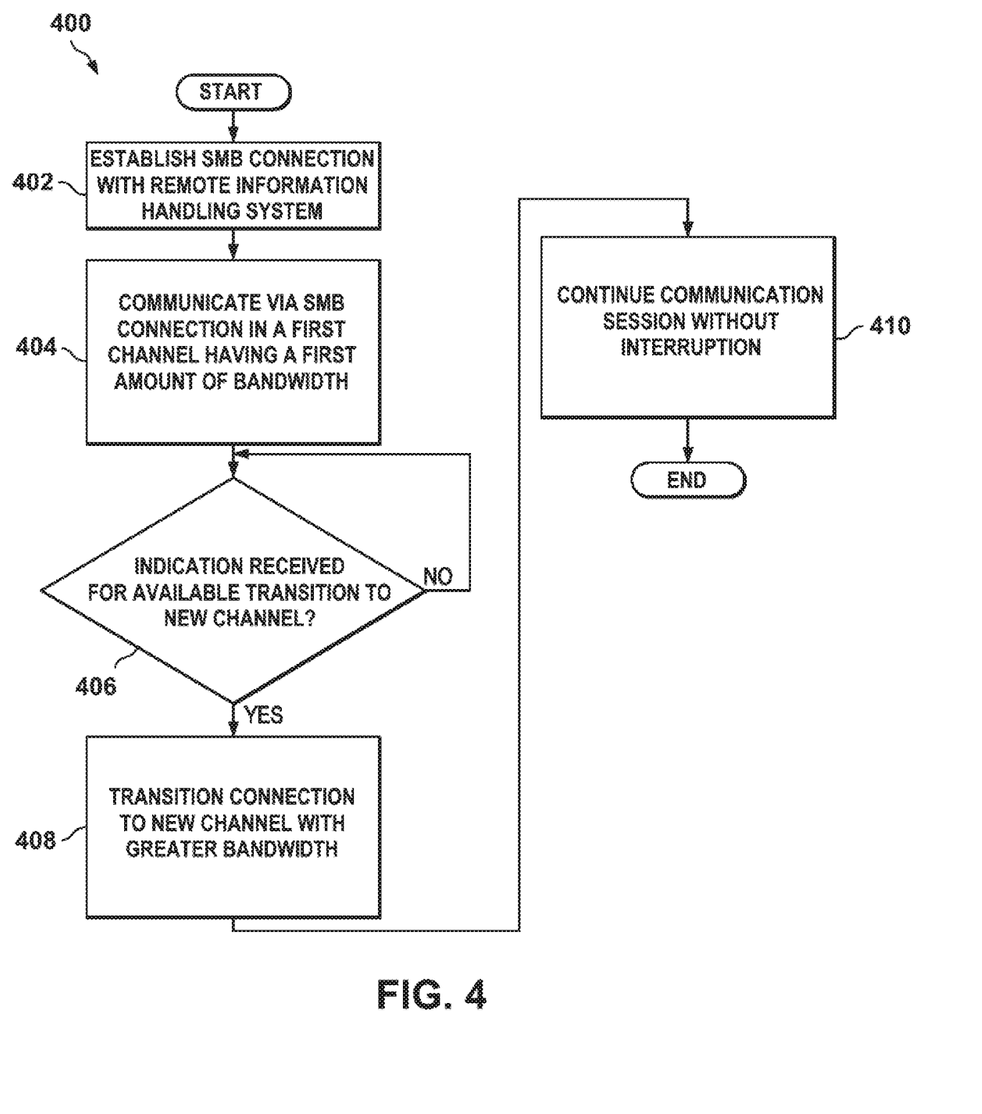
FIG. 4 illustrates a flow chart of an example method, in accordance with embodiments of the present disclosure.

Turning now to FIG. 4, a flow chart of an example method 400 is shown for transitioning a communications session from one channel to another channel, in accordance with certain embodiments of the present disclosure. According to some embodiments, method 400 may begin at step 402. As noted above, teachings of the present disclosure may be implemented in a variety of configurations, such as within the context of information handling systems 102.

At step 402, an SMB connection may be established between an information handling system and a remote information handling system. Either of these information handling systems may be the server or client, in various embodiments. As discussed above, this connection may be established with one or more capability bits or flags set in the protocol header, indicating that both peers support SMD.

At step 404, communications proceed as normal via the SMB connection, according to a first channel. For example, the first channel may be a TCP/IP channel, which may have a first bandwidth (e.g., a relatively low bandwidth).

At step 406, the information handling system determines whether an indication has been received for available transition to a new channel. Such an indication may originate within the information handling system itself, within the remote information handling system, or from elsewhere in the network. Such an indication may include an indication of the available bandwidth for an RDMA channel.

If no such indication is received, the method may loop back to step 406, and the information handling system may continue to check (e.g., periodically) to determine whether such an indication is received. When eventually such an indication is received, the method proceeds to step 408.

At step 408, the information handling system transitions the connection to a new channel having additional bandwidth. This transition may be effected, for example, according to a message sequence such as that shown and described in FIG. 3.

At step 410, the communication session is continued without interruption. For example, existing descriptors and tree connects may remain valid, and existing file transfers may continue without interruption or data retransmission.

After step 410, method 400 ends.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
at least one processor; and
a network interface controller communicatively coupled to the at least one processor and configured to provide network communication between the information handling system and a remote information handling system according to a Server Message Block (SMB) protocol;
wherein the information handling system is configured to:
establish a communication session with the remote information handling system according to a first SMB channel having a first bandwidth in response to unavailability of a second, different SMB channel having a second bandwidth greater than the first bandwidth;
register an SMB renegotiation module to receive high-bandwidth availability events;
set, by a driver of the network interface controller, a bandwidth availability bit;
receive, at the SMB renegotiation module, a high-bandwidth availability event in response to the setting of the bandwidth availability bit and in response to the second SMB channel becoming available; and
transition the communication session to the second SMB channel.

2. The information handling system of claim 1, wherein the network communication comprises communication via a fibre channel network.

3. The information handling system of claim 1, wherein the information handling system is configured to initiate the communication session.

4. The information handling system of claim 1, wherein the remote information handling system is configured to initiate the communication session.

5. The information handling system of claim 1, wherein the first channel is a Transmission Control Protocol/Internet Protocol (TCP/IP) channel.

6. The information handling system of claim 5, wherein the second SMB channel is a remote direct memory access (RDMA) channel.

7. A method comprising:
establishing, via a network interface controller of an information handling system, a communication session with a remote information handling system, wherein the communication session is established according to a Server Message Block (SMB) protocol using a first SMB channel having a first bandwidth in response to unavailability of a second, different SMB channel having a second bandwidth greater than the first bandwidth;
registering an SMB renegotiation module to receive high-bandwidth availability events;
setting, by a driver of the network interface controller, a bandwidth availability bit;
receiving, at the SMB renegotiation module, a high-bandwidth availability event in response to the setting of the bandwidth availability bit and in response to the second SMB channel becoming available; and
transitioning the communication session to the second SMB channel.

8. The method of claim 7, wherein the communication session is established between a virtual machine of the information handling system and the remote information handling system.

9. The method of claim 7, wherein the communication session is established via a basic input/output system (BIOS) of the information handling system, prior to loading of an operating system.

10. An article of manufacture comprising a non-transitory, computer-readable medium having instructions coded thereon that, when executed by at least one processor of an information handling system, cause the information handling system to:
establish, via a network interface controller of the information handling system, a communication session with a remote information handling system, wherein the communication session is established according to a Server Message Block (SMB) protocol using a first SMB channel having a first bandwidth in response to unavailability of a second, different SMB channel having a second bandwidth greater than the first bandwidth;
register an SMB renegotiation module to receive high-bandwidth availability events;
set, by a driver of the network interface controller, a bandwidth availability bit;
receive, at the SMB renegotiation module, a high-bandwidth availability event in response to the setting of the bandwidth availability bit and in response to the second SMB channel becoming available; and
transition the communication session to the second SMB channel.

11. The article of claim 10, wherein the establishing and the transitioning are implemented via a driver of the information handling system configured to control the network interface controller.

12. The article of claim 10, wherein the transitioning includes maintaining at least one open descriptor associated with the communication session such that the open descriptor remains valid after the transitioning.

13. The article of claim 10, wherein the transitioning includes maintaining at least one tree identifier associated with the communication session such that the tree identifier remains valid after the transitioning.

14. The article of claim 10, wherein the instructions are further for:
beginning a file transfer via the communication session prior to the transitioning; and
continuing the file transfer after the transitioning, wherein the continuing does not include retransmission of file data transmitted prior to the transitioning.

15. The article of claim 10, wherein the establishing includes sending at least one protocol negotiation header including a flag indicative of a transitioning capability.

16. The article of claim 10, wherein the instructions are further for:
after the transitioning, and in response to a second indication, transitioning the communication session from the second SMB channel back to the first SMB channel.

17. The article of claim 16, wherein the instructions are further for transmitting the second indication to the remote information handling system.

18. The article of claim 16, wherein the second indication is received from the remote information handling system.

19. The article of claim 10, wherein the second SMB channel is a remote direct memory access (RDMA) channel.

* * * * *